(12) United States Patent
Nania

(10) Patent No.: US 10,202,026 B1
(45) Date of Patent: Feb. 12, 2019

(54) MULTI-PANEL MOONROOF AND METHOD OF USING THE SAME

(71) Applicant: Ford Global Technologies, LLC, Dearborn, MI (US)

(72) Inventor: Adrian Nania, Rochester, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/673,725

(22) Filed: Aug. 10, 2017

(51) Int. Cl.
*B60J 7/047* (2006.01)
*B60J 7/00* (2006.01)
*B60J 7/043* (2006.01)
*B60J 7/057* (2006.01)
*B60J 7/11* (2006.01)
*B60J 7/10* (2006.01)

(52) U.S. Cl.
CPC ............ *B60J 7/047* (2013.01); *B60J 7/0015* (2013.01); *B60J 7/043* (2013.01); *B60J 7/0573* (2013.01); *B60J 7/106* (2013.01); *B60J 7/11* (2013.01)

(58) Field of Classification Search
CPC . B60J 7/047; B60J 7/0435; B60J 7/106; B60J 7/0573
USPC .............. 296/220.01, 218, 102, 103, 216.03, 296/216.05, 223
See application file for complete search history.

(56) References Cited

U.S. PATENT DOCUMENTS

| | | | | |
|---|---|---|---|---|
| 5,169,206 A | * | 12/1992 | Omoto | B60J 7/0573 296/219 |
| 5,738,405 A | * | 4/1998 | Richters | B60J 1/085 296/146.15 |
| 6,056,352 A | * | 5/2000 | Ewing | B60J 7/0038 200/61.69 |
| 6,129,413 A | | 10/2000 | Klein | |
| 6,830,284 B2 | | 12/2004 | Guillez et al. | |
| 6,942,286 B2 | * | 9/2005 | Bohm | B60J 7/047 296/216.05 |
| 7,314,246 B2 | | 1/2008 | MacNee, III et al. | |
| 7,744,145 B2 | | 6/2010 | Mooney et al. | |
| 7,922,233 B2 | | 4/2011 | Park et al. | |
| 2003/0011215 A1 | * | 1/2003 | Arnold | B60J 7/0435 296/223 |
| 2008/0284213 A1 | * | 11/2008 | Pomeroy | B60J 7/022 296/218 |
| 2009/0045655 A1 | | 2/2009 | Willard et al. | |
| 2012/0090243 A1 | * | 4/2012 | Ferragatta | B60J 7/0435 49/246 |

(Continued)

FOREIGN PATENT DOCUMENTS

DE 10009437 A1 9/2001

OTHER PUBLICATIONS

Instruments and Controls, Section 1, pp. 123-138.
A Guide to Sunroof Glass, Safelite AutoGlass. https://www.safelite.com/windshield-auto-glass-technology/sunroof.

*Primary Examiner* — Dennis H Pedder
(74) *Attorney, Agent, or Firm* — Carlson, Gaskey & Olds, P.C.

(57) ABSTRACT

A moonroof for a motor vehicle according to an exemplary aspect of the present disclosure includes, among other things, a first panel, a second panel, and a third panel. The second panel is between the first and third panels when the moonroof is closed. Further, the first and second panels are independently moveable relative to the third panel. A method is also disclosed.

16 Claims, 19 Drawing Sheets

(56) References Cited

U.S. PATENT DOCUMENTS

2015/0048645 A1* 2/2015 Nellen .................... B60J 7/047
296/108

* cited by examiner

MULTI-PANEL MOONROOF AND METHOD OF USING THE SAME

TECHNICAL FIELD

This disclosure relates to a handle for a moonroof for a motor vehicle and a method of using the same. In particular, this disclosure relates to a multi-panel moonroof.

BACKGROUND

Motor vehicles are known to include moonroofs, which is a transparent section of the roof of the motor vehicle. Typically, the transparent section is provided by one or more transparent panels, which are fixed or moveable. In some example, the panels are slidable between a roof of the vehicle and a headliner to expose an opening in the roof, which allows light and fresh air to enter the passenger cabin.

SUMMARY

A motor vehicle according to an exemplary aspect of this disclosure includes, among other things, a moonroof including a first panel, a second panel, and a third panel. The second panel is forward of the third panel and rearward of the first panel when the moonroof is closed. Further, the first and second panels are independently moveable relative to the third panel.

In a further non-limiting embodiment of the foregoing motor vehicle, the first and second panels are configured to move by traveling above a roof of the motor vehicle.

In a further non-limiting embodiment of any of the foregoing motor vehicles, the first and second panels are independently moveable to a fully open position substantially above the third panel.

In a further non-limiting embodiment of any of the foregoing motor vehicles, the first and second panels are over the third panel when in the fully open position.

In a further non-limiting embodiment of any of the foregoing motor vehicles, movement of the first panel is guided by a first set of drive tracks, and movement of the second panel is guided by a second set of guide tracks. Further, the first and second sets of guide tracks each have a variable height along their length.

In a further non-limiting embodiment of any of the foregoing motor vehicles, the first set of tracks are arranged such that the first panel travels at a first height when over the second panel and a second height greater than the first height when over the third panel, and the second set of tracks are arranged such that the second panel travels at a third height when over the third panel. Further, the third height is less than the second height.

In a further non-limiting embodiment of any of the foregoing motor vehicles, each of the first and second sets of tracks includes a set of drive tracks and a set of idler tracks.

In a further non-limiting embodiment of any of the foregoing motor vehicles, the motor vehicle includes a seal creating a seal path surrounding each of the sets of drive tracks.

In a further non-limiting embodiment of any of the foregoing motor vehicles, the motor vehicle includes a first drive motor configured to drive first panel and a second drive motor configured to drive the second panel.

In a further non-limiting embodiment of any of the foregoing motor vehicles, the motor vehicle includes a controller configured to command movement of the first and second drive motors.

In a further non-limiting embodiment of any of the foregoing motor vehicles, the first and second drive motors are mounted to a body section of the motor vehicle supporting the third panel, and the body section is removable from the remainder of the motor vehicle together with the first, second, and third panels and the first and second drive motors.

In a further non-limiting embodiment of any of the foregoing motor vehicles, the motor vehicle includes a roller blind configured to be deployed and retracted.

In a further non-limiting embodiment of any of the foregoing motor vehicles, the first and second panels are independently tiltable relative to a roof of the motor vehicle.

In a further non-limiting embodiment of any of the foregoing motor vehicles, the first, second, and third panels are glass panels.

A method according to an exemplary aspect of the present disclosure includes, among other things, independently moving a second panel of a moonroof relative to a first panel of the moonroof and a third panel of the moonroof. The second panel is forward of the third panel and rearward of the first panel when the moonroof is closed.

In a further non-limiting embodiment of the foregoing method, the method further includes independently tilting the first and second panels relative to a roof.

In a further non-limiting embodiment of any of the foregoing methods, the method further includes moving the first and second panels in a rearward direction to a fully open position above the third panel.

In a further non-limiting embodiment of any of the foregoing methods, the method further includes varying a height of the first and second panels as the first and second panels move in the rearward direction.

In a further non-limiting embodiment of any of the foregoing methods, the first panel travels over the second panel at a first height and travels over the third panel at a second height greater than the first height, and wherein the second panel travels over the third panel at a third height less than the second height.

In a further non-limiting embodiment of any of the foregoing methods, the method further includes removing a section of a body of a vehicle containing the first, second, and third panels when the first and second panels are in the fully open position.

BRIEF DESCRIPTION OF THE DRAWINGS

In FIG. 1, the moonroof is closed.

In FIG. 2, a first panel of the moonroof has moved rearward relative to FIG. 1, exposing a first opening in the roof.

In FIG. 3, the moonroof is in a fully open position.

In FIG. 4, a second panel of the moonroof has moved rearward relative to FIG. 1, exposing a second opening in the roof.

FIG. 15 schematically illustrates the first panel moving rearward over the second panel and engaging the second drive and idler ramps.

FIG. 16 schematically illustrates the first panel moving rearward over the second panel and being vertically raised by the second drive and idler ramps.

FIG. 17 schematically illustrates the first panel over the third panel.

FIG. 18 schematically illustrates the second panel moving rearward and engaging first drive and idler ramps.

FIG. 19 schematically illustrates the second panel over the third panel and beneath the first panel.

DETAILED DESCRIPTION

This disclosure relates to a moonroof for a motor vehicle. In particular, the moonroof is a multi-panel moonroof, including a first panel, a second panel, and a third panel. The second panel is between the first and third panels when the moonroof is closed. Further, the first and second panels are independently moveable relative to the third panel. This arrangement provides an enhanced user experience by allowing individual control over the first and second panels, among other benefits. Further, when fully opened, the first, second, and third panels are vertically stacked over one another which allows for easy removal and storage of the moonroof panels.

Figure 1:
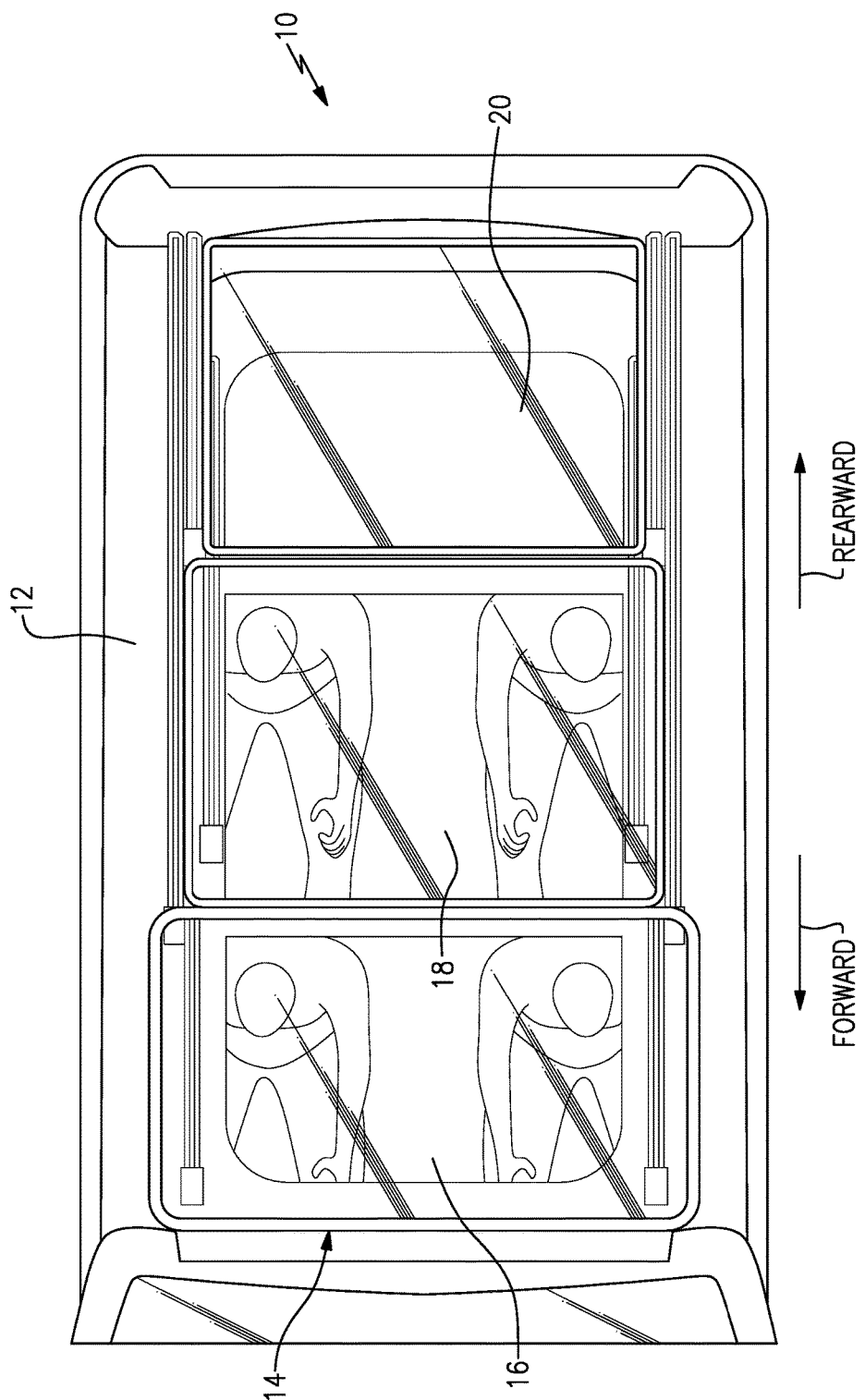
FIG. 1 is a top view of a motor vehicle with an example moonroof.

Referring to the drawings, FIG. 1 is a top view of a motor vehicle 10, and in particular shows the roof 12 of the motor vehicle. In FIG. 1, the motor vehicle 10 is a sport utility vehicle (SUV), but it should be understood that this disclosure extends to other types of vehicles. The roof 12 includes a moonroof 14 having a plurality of panels. In particular, the moonroof 14 includes a first panel 16, a second panel 18, and a third panel 20. The panels 16, 18, 20 are made of a transparent material, which in one example is glass. This disclosure is not limited to any particular material type for the panels 16, 18, 20, however.

In FIG. 1, the moonroof 14 is closed. When closed, upper surfaces of the panels 16, 18, 20 are substantially flush with the upper surface of the roof 12. Further, when closed, the panels 16, 18, 20 are arranged such that the first panel 16 is forward of the second panel 18, the second panel 18 is rearward of the first panel 16 and forward of the third panel 20, and the third panel 20 is rearward of the second panel 18. The "forward" and "rearward" directions are labeled in FIG. 1 for ease of reference. Together, the panels 16, 18, 20 cover an opening in the roof 12 when closed, which protects the vehicle cabin and its occupants from the outside environment.

The moonroof 14 includes moveable panels configured to selectively expose at least a portion of the opening in the roof 12. Opening the roof 12 exposes the vehicle cabin and its occupants to the outside environment. During periods of good weather, exposing the opening in the roof 12 can lead to increased enjoyment and an enhanced riding experience for the occupants of the vehicle.

Figure 2:
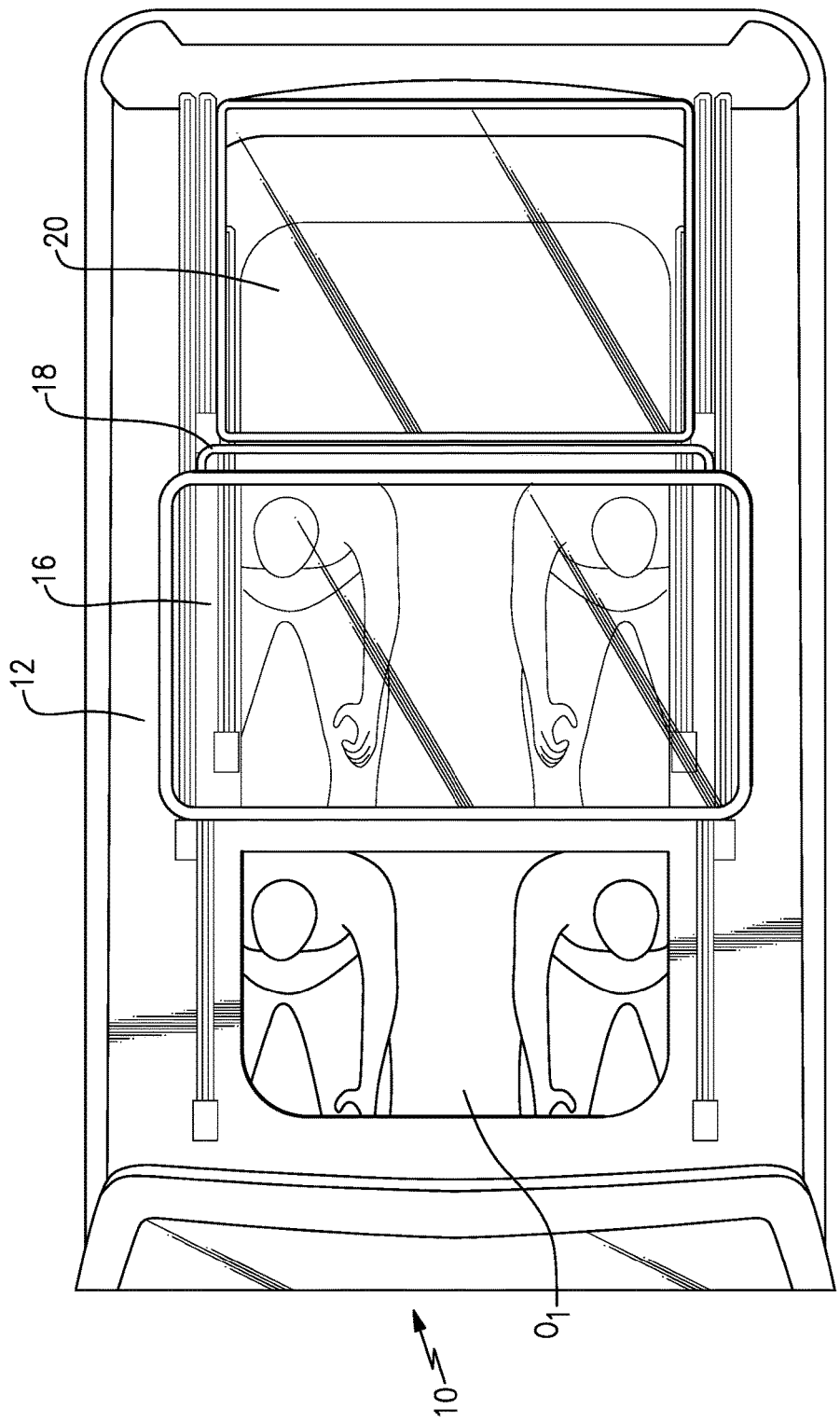
FIG. 2 is a top view of the motor vehicle.
Figure 3:
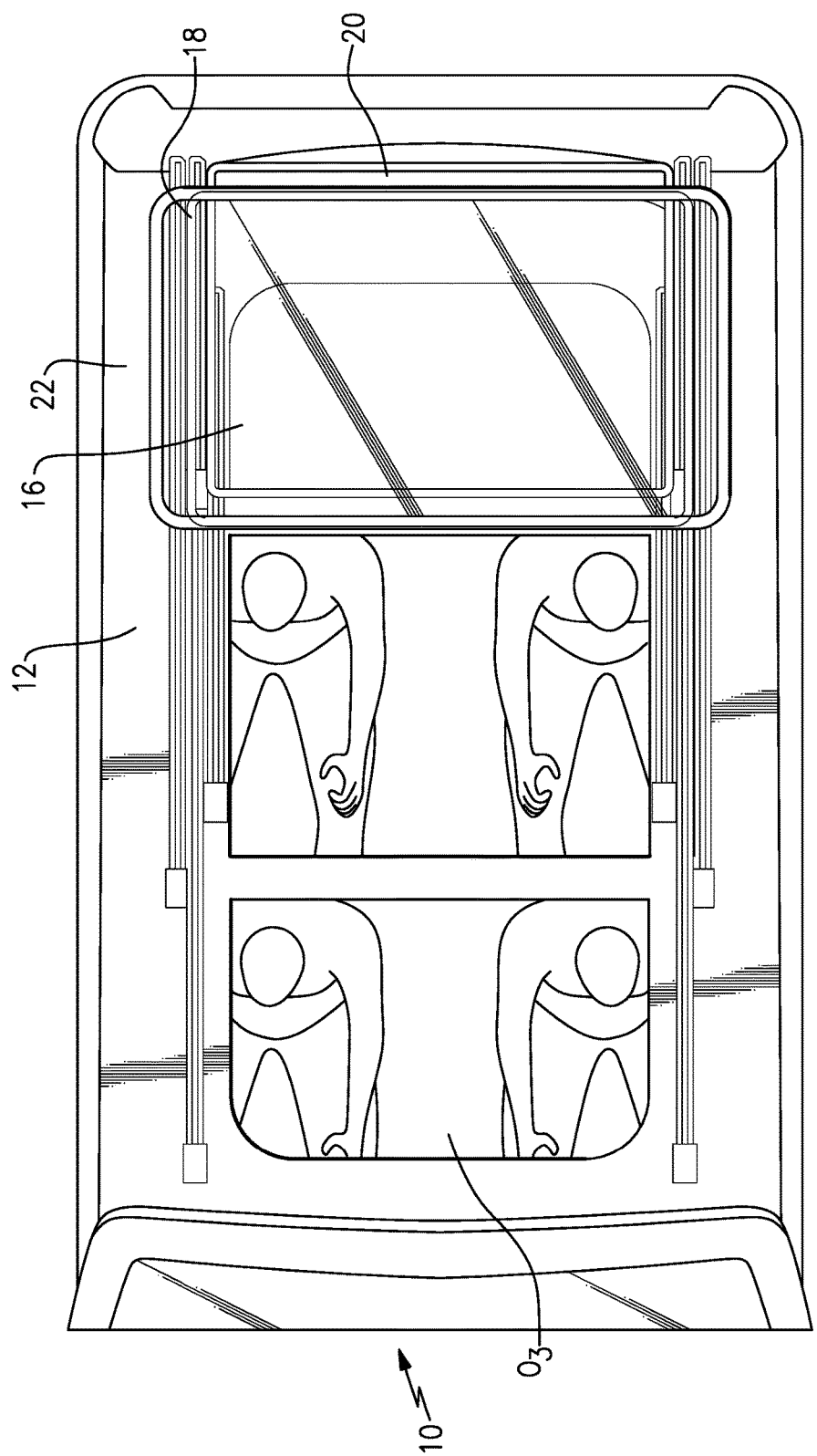
FIG. 3 is a top view of the motor vehicle.

In this disclosure, the first and second panels 16, 18 are independently moveable relative to the third panel 20. Specifically, the first panel 16 is moveable between a closed position (FIG. 1), an intermediate position (FIG. 2), and a fully open position (FIG. 3). In the intermediate position of FIG. 2, the first panel 16 has moved rearward relative to the closed position and is over the second panel 18. With the first panel 16 in the intermediate position, a first opening $O_1$ in the roof 12 is exposed forward of the second panel 18. The first opening $O_1$ has an area substantially equal to the area of the first panel 16, and exposes the driver and front-passenger of the vehicle 10 to the environment. The moonroof 14 may be arranged as shown in FIG. 2 when only the driver and/or the front-passenger desire such exposure, while the remaining occupants of the vehicle 10 do not desire such exposure, for example.

Figure 4:
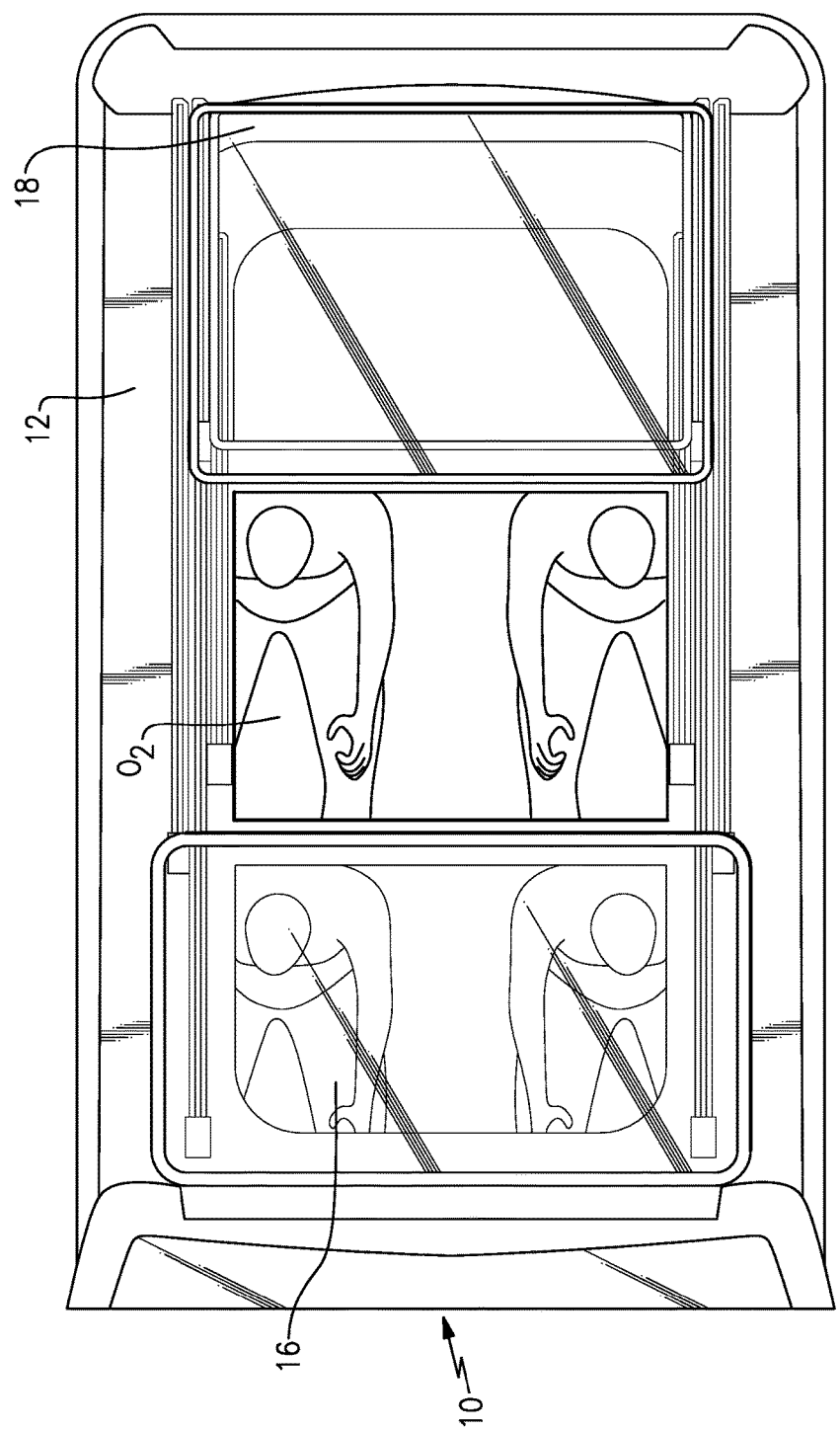
FIG. 4 is a top view of the motor vehicle.

With reference to FIG. 4, the second panel 18 is moveable independent of the first panel 16 between the closed position (FIG. 1) and a fully open position (FIG. 4). In FIG. 4, the first panel 16 is closed and the second panel 18 has moved rearward and is over the third panel 20, exposing a second opening $O_2$ rearward of the first panel 16 and forward of the third panel 20. The second opening $O_2$ has an area substantially equal to an area of the second panel 18. Independent movement of the second panel 18 may enhance a riding experience of rear passengers seated immediately behind the driver and front-passenger. The moonroof 14 may be arranged as shown in FIG. 4 when the rear passengers desire exposure to the environment while the driver and front-passenger do not, for example. Alternatively, the FIG. 4 arrangement may be useful to provide desired venting and airflow throughout the vehicle 10.

In FIG. 3, both the first and second panels 16, 18 have been moved to a fully open position (i.e., the moonroof 14 is in a fully open position) substantially over the third panel 20, exposing an opening $O_3$ in the roof 12. In particular, the first and second panels 16, 18 vertically overlap the third panel 20. Further, as explained in detail below, the first and second panels 16, 18 are vertically stacked over one another. In one particular example, the first panel 16 is vertically over the second panel 18, which is in turn vertically over the third panel 20.

The opening $O_3$ is larger than the openings $O_1$ and $O_2$, and in this example provides an opening in the roof 12 having an area substantially equal to the sum of the openings $O_1$ and $O_2$. The opening $O_3$ provides a relatively large opening which, in good weather conditions, may substantially enhance a rider experience.

Another benefit of the independent movement of the panels 16, 18 is the increased ease of removability and storage of the panels 16, 18, 20. When in the fully open position of FIG. 3, the panels 16, 18, 20 are completely supported by a body section 22 that is removable from the remainder of the vehicle 10. The body section 22 and the panels 16, 18, 20 are removable from the vehicle as a single unit. The body section 22 may be attachable to the remainder of the vehicle 10 by way of fasteners or some other known attachment technique.

Figure 5:
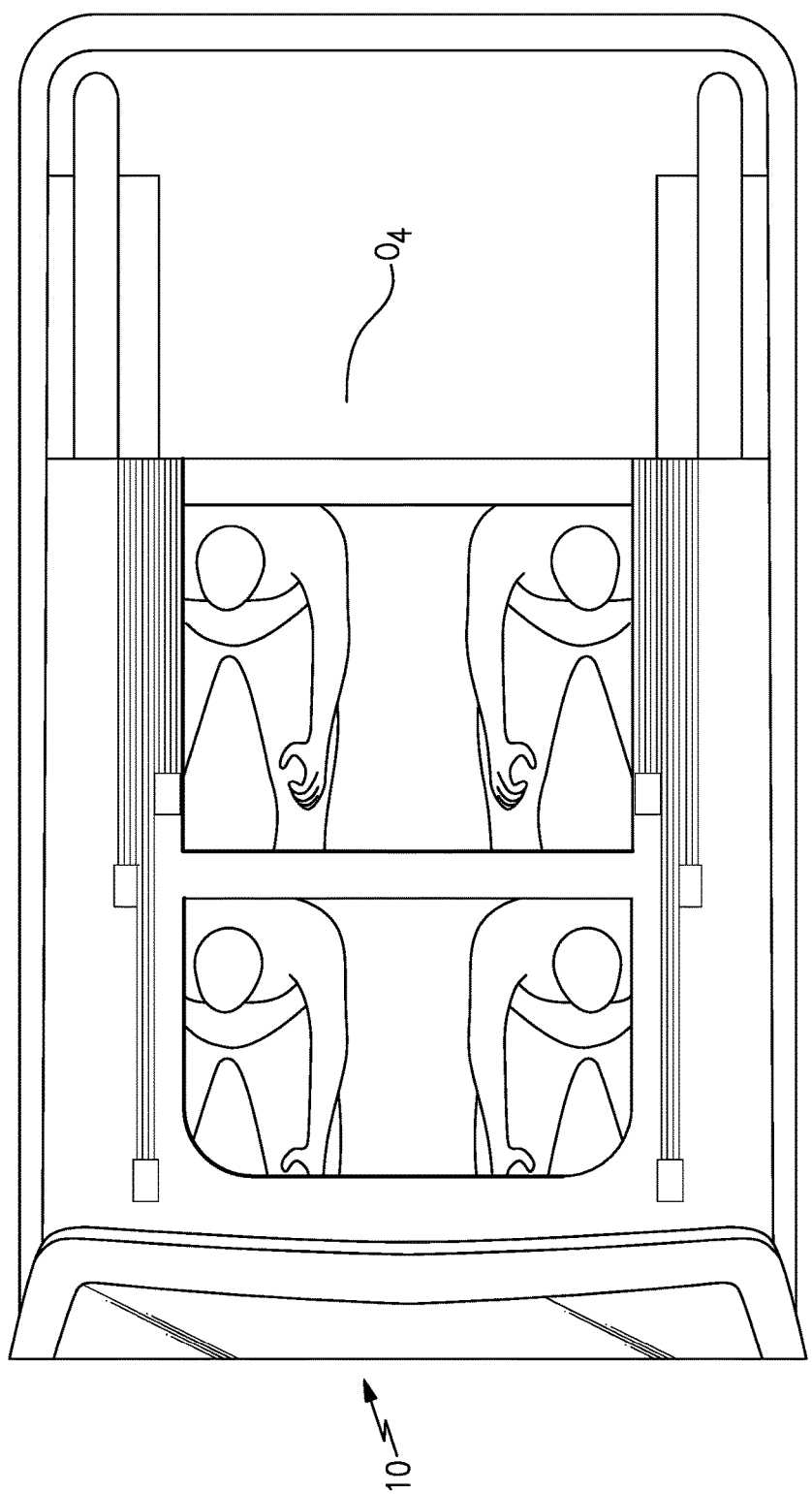
FIG. 5 is a top view of the motor vehicle with the moonroof removed from the remainder of the vehicle.

FIG. 5 shows the vehicle 10 with the body section 22 removed. Removing the panels 16, 18, 20 and the body section 22 exposes an opening O₄ in the roof 12. The opening O₄ is larger than the opening O₃, and provides another level of exposure to the outside environment, which the occupants may desire in some conditions.

Figure 6:
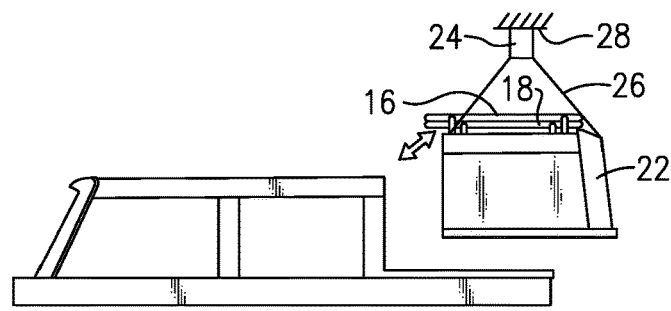
FIG. 6 schematically illustrates a body section of the vehicle being removed from the vehicle and stored.

When in the fully open position of FIG. 3, the body section 22 supports each of the panels 16, 18, 20, and thus a user can remove the panels 16, 18, 20 as a single unit together with the body section 22. FIG. 6 illustrates the body section 22 and the panels 16, 18, 20 being removed, as a single unit, from the remainder of the vehicle 10 and stored by being hung relative to a fixture 24 by a hanger 26. The fixture 24 may be affixed to a ceiling 28, such as a ceiling of a garage.

Figure 7A:
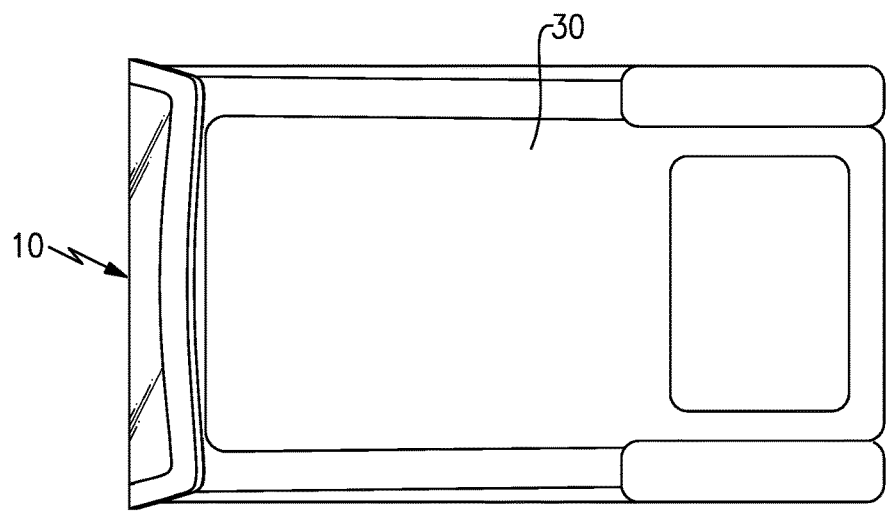
FIG. 7A is a top view of the motor vehicle with a soft top cover.
Figure 7B:
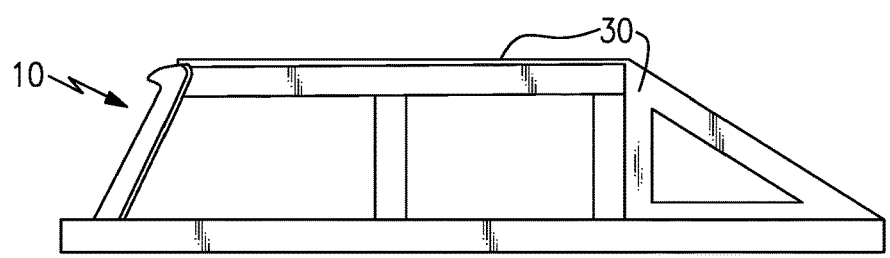
FIG. 7B is a side view of the motor vehicle with a soft top cover.

When the body section 22 and the panels 16, 18, 20 are removed, the user can choose to operate the vehicle 10 with the opening O₄ exposed, or may optionally use a soft top 30 to cover the opening O₄, as shown in FIGS. 7A and 7B. The soft top 30 is made of a relatively soft fabric and is sized to cover the opening O₄. The soft top 30 may be affixed to the roof 12 using a known attachment technique, such as attachments using buttons or latches. Alternatively, the soft top 30 may be affixed to the roof 12 using the tracks that guide movement of the panels 16, 18, described below.

The independent movement of the first and second panels 16, 18 illustrated across FIGS. 1-4 provides the moonroof 14 with increased functionality over prior designs. In this disclosure, in order to achieve this independent movement, the first and second panels 16, 18 are configured to travel outside of the vehicle 10. In particular, the first and second panels 16, 18 travel above the roof 12, as opposed to moonroofs having panels that travel in a space between a roof and a vehicle headliner, for example. Thus, movement of the panels 16, 18 does not take up any cargo space within the vehicle 10. Further, in this disclosure, the height of the first and second panels 16, 18 is variable as they travel in the forward and rearward directions. The variable height prevents the panels 16, 18 from interfering with one another or with the third panel 20 throughout their respective ranges of movement.

Figure 8:
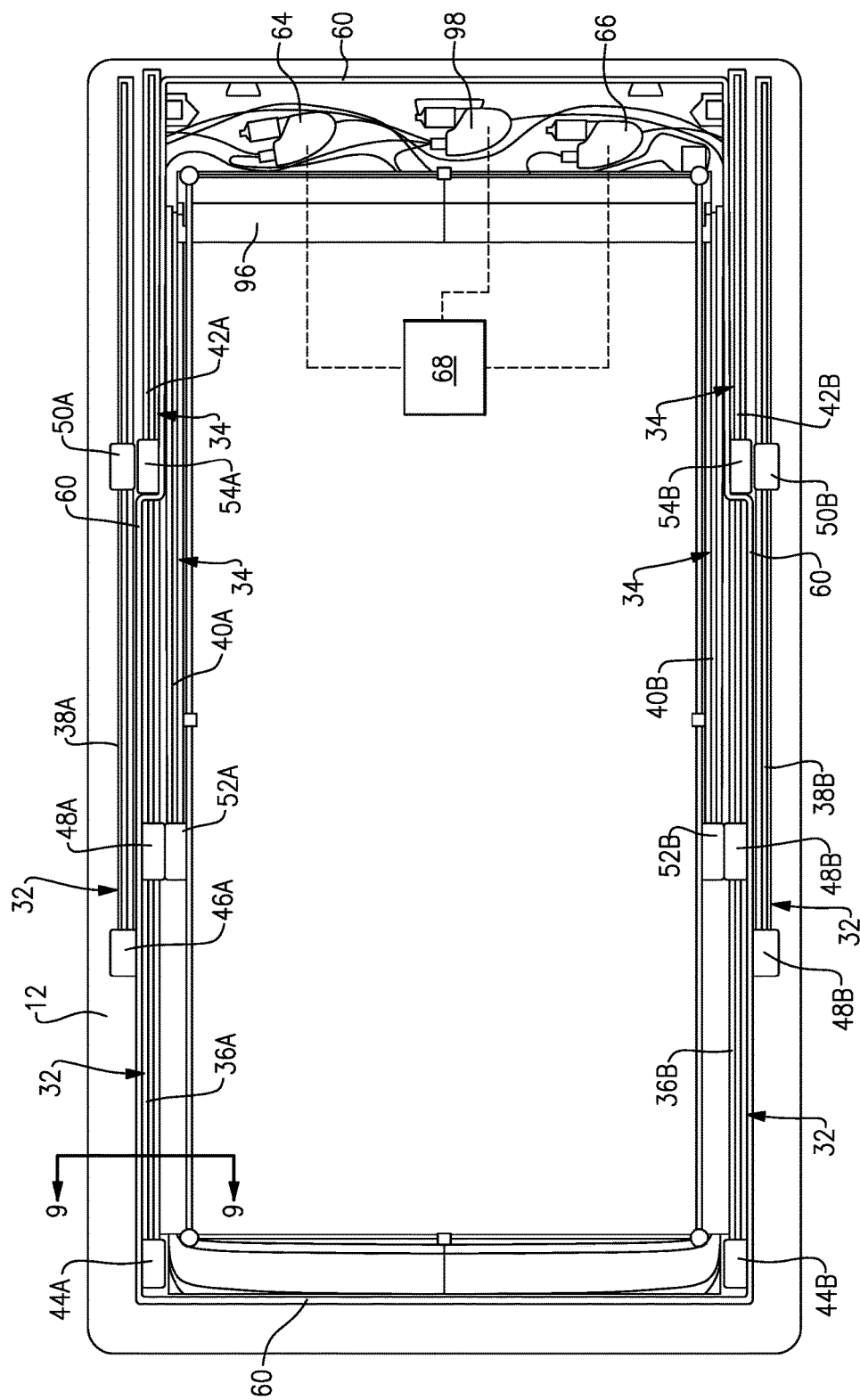
FIG. 8 is a top view of the motor vehicle with the panels removed.

FIG. 8 schematically illustrates a track arrangement configured to guide movement of the first and second panels 16, 18. The panels 16, 18, 20 are not illustrated in FIG. 8 for ease of reference. The track arrangement includes a plurality of tracks provided in the roof 12, which includes a first set of tracks 32 configured to guide movement of the first panel 16 and a second set of tracks 34 configured to guide movement of the second panel 18. The first and second sets of tracks 32, 34 can be made of aluminum, and can be bolted to the roof 12 of the vehicle 10. The tracks can be made of other materials, however, and can be attached to the vehicle 10 using other attachment techniques.

The first set of tracks 32 includes a first set of drive tracks 36A, 36B on opposite sides of the vehicle. The first set of tracks 32 also includes a first set of idler tracks 38A, 38B outside, relative to a centerline of the vehicle 10, the first set of drive tracks 36A, 36B. The second set of tracks 34 includes a second set of drive tracks 40A, 40B and a second set of idler tracks 42A, 42B outside the second set of drive tracks 40A, 40B. Further, in this example, the second set of drive tracks 40A, 40B is inside the first set of drive tracks 36A, 36B, and the first set of idler tracks 42A, 42B are inside the second set of idler tracks 38A, 38B.

The height of the first and second sets of tracks 32, 34 is variable along their respective lengths. With reference to the first set of tracks 32, the first panel 16 includes at least one roller configured to travel through each of the tracks 36A, 36B, 38A, 38B. As the height of these tracks changes, the rollers and, in turn, the first panel 16 are raised or lowered.

At a forward end of the drive tracks 36A, 36B, the drive tracks include first drive ramps 44A, 44B. Likewise, at a forward end of the idler tracks 38A, 38B, the idler tracks include first idler ramps 46A, 46B. The first ramps 44A, 44B, 46A, 46B are inclined and arranged such that rearward movement of the first panel 16 causes rollers to engage the ramps, which raises the first panel 16. Specifically, the first ramps 44A, 44B, 46A, 46B raise the first panel 16 to a first height $H_1$ (FIG. 14) above the roof 12 and the second panel 18 such that the first panel 16 can move rearward independent of the second panel 18.

With continued reference to the first set of tracks 32, the drive tracks 36A, 36B include second drive ramps 48A, 48B rearward of the first drive ramps 44A, 44B, and likewise the idler tracks 38A, 38B include second idler ramps 50A, 50B rearward of the first idler ramps 46A, 46B. The second ramps 48A, 48B, 50A, 50B are inclined and arranged such that additional rearward movement of the first panel 16 causes the rollers to engage these ramps, which in turn raises the first panel 16 to second height $H_2$ (FIG. 17) greater than the first height $H_1$ as the first panel 16 travels over the third panel 20. Specifically, the second ramps 48A, 48B, 50A, 50B raise the first panel 16 to a height sufficient to provide a clearance for the second panel 18 below the first panel 16.

The second set of tracks 34 also includes first drive ramps 52A, 52B at a forward end of the drive tracks 40A, 40B and first idler ramps 54A, 54B at a forward end of the idler tracks 42A, 42B. Rearward movement of the second panel 18 causes the rollers within the tracks 40A, 40B, 42A, 42B to engage a respective ramp 52A, 52B, 54A, 54B, which raises the height of the second panel 18 to a third height $H_3$ (FIG. 19) above the roof 12. The third height $H_3$ is less than the second height $H_2$ of the first panel 16, which allows the second panel 18 to fit between the first panel 16 and the third panel 20 when in the fully open position.

Figure 9:
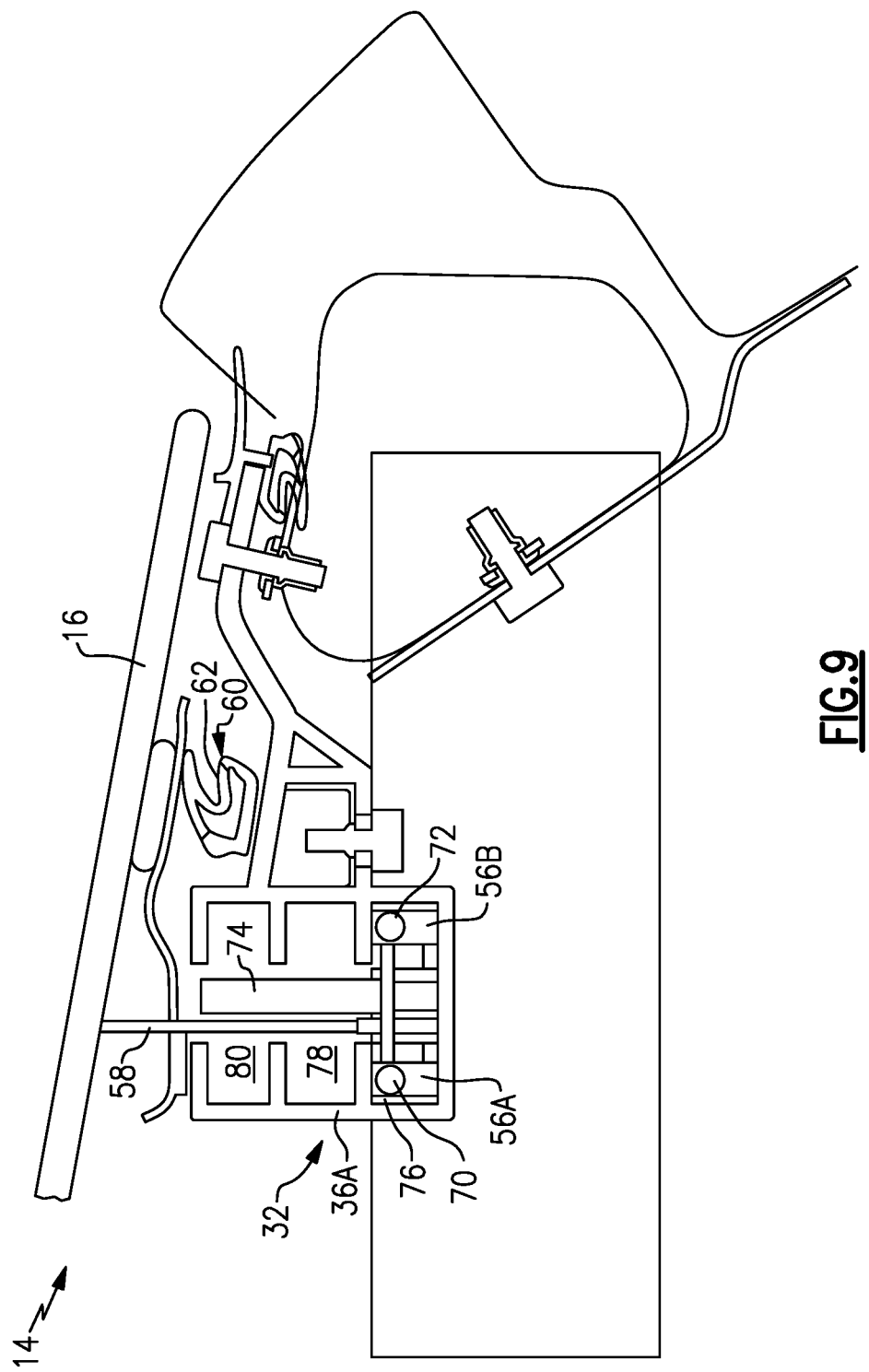
FIG. 9 is a cross-sectional view taken along line 9-9 in FIG. 8.

As noted above, there are rollers within each of the first and second sets of tracks 32, 34 that allow movement of the first and second panels 16, 18, respectively. FIG. 9 illustrates a first set of rollers 56A, 56B within one of the first drive tracks 36A. The rollers 56A, 56B may be wheels configured to roll within the first drive track 36A. In this example, the rollers 56A, 56B are coupled to the first panel 16 by a support arm 58. The rollers 56A, 56B are provided on opposite sides of the support arm 58.

While FIG. 9 illustrates a first set of rollers 56A, 56B within the first drive track 36A, it should be understood that the remaining drive tracks 36A, 40A, 40B and idler tracks 38A, 38B, 42A, 42B can be arranged in substantially the same way. In this disclosure, rollers within the drive tracks are referred to as drive rollers, and rollers within the idlers tracks are referred to as idler rollers. It should also be understood that this disclosure is not limited to any particular roller arrangement.

With reference to FIG. 8, the moonroof 12 also includes a drive track seal 60 surrounding each of the drive tracks 36A, 36B, 40A, 40B. The drive track seal 60 prevents unwanted contaminants from entering the drive tracks, and is also useful for preventing water from entering the drive tracks 36A, 36B, 40A, 40B and the vehicle cabin. The drive track seal 60 is provided by at least one seal and is arranged to provide a continuous seal path.

As shown in FIG. 9, the drive track seal 60 is configured to contact the first panel 16 when the first panel 16 is in the closed position. Further, in this example, the drive track seal 60 has a concave surface 62 facing away from a centerline of the vehicle 10. This arrangement increases the effectiveness of the drive track seal 60. While one particular seal is shown in FIG. 9, it should be understood that this disclosure extends to other sealing arrangements.

With reference to FIG. 8, the first and second panels 16, 18 are moveable by first and second drive motors 64, 66, respectively. The first and second drive motors 64, 66 are configured to drive the first and second panels 16, 18 in the forward and rearward directions. In this example, the first and second drive motors 64, 66 are controlled in response to instructions from a controller 68. It should be understood that the controller 68 could be part of an overall vehicle control module, such as a vehicle system controller (VSC), or could alternatively be a stand-alone controller separate from the VSC. Further, the controller 68 may be programmed with executable instructions for interfacing with and operating the various components of the vehicle 10. The controller 68 additionally includes a processing unit and non-transitory memory for executing the various control strategies and modes of the vehicle system.

Each of the first and second drive motors 64, 66 is mounted to the body section 22. Thus, the first and second drive motors 64, 66 are removable from the remainder of the vehicle 10 together with the body section 22, first panel 16, and second panel 18. Packaging the first and second drive motors 64, 66, and their associated wiring, within the body section 22 increases the ease of removability of the body section 22.

The first and second drive motors 64, 66 are mechanically coupled to the first and second panels 16, 18, respectively, by cables, such as push-pull cables (e.g., Bowden cables), in this example. FIG. 9 illustrates two example attachment points 70, 72 for the cables. The cables are arranged, in this example, to couple directly to an elevator block 74. The elevator block 74 is coupled to the rollers 56A, 56B such that movement of the elevator block 74 results in movement of the rollers 56A, 56B. The elevator block 74 is configured to move the rollers 56A, 56B in the forward and rearward directions while also permitting vertical movement of the rollers 56A, 56B as the height of the tracks change.

In this example, the first drive track 36A includes three segments, each at a different height. With joint reference to FIGS. 8 and 9, a first segment 76 of the first drive track 36A is a lowest-height segment and corresponds to the rollers 56A, 56B being positioned forward of the first drive ramp 44A. The first drive track 36A includes a second segment 78, which is higher than the first segment 76, and corresponds to the rollers 56A, 56B traveling between the first drive ramp 44A and the second drive ramp 48A. The first drive ramp 44A is inclined between the first segment 76 and the second segment 78 such that rearward movement of the rollers 56A, 56B against the first drive ramp 44A causes the rollers 56A, 56B to move from the first segment 76 to the second segment 78. The second drive ramp 48A, likewise, is inclined between the second segment 78 and a third segment 80 such that rearward movement of the rollers 56A, 56B against the second drive ramp 48A causes the rollers 56A, 56B to move from the second segment 78 to the third segment 80. The third segment 80 corresponds to movement of the rollers 56A, 56B rearward of the second drive ramp 48A.

While FIG. 9 illustrates one example arrangement of the rollers 56A, 56B relative to the first drive track 36A, it should be understood that the first drive track 36B would be arranged similarly. Further, the first idler tracks 38A, 38B could also be arranged similarly, but the idler tracks 38A, 38B need not include an elevator block or attachment points for the cables. The second drive tracks 40A, 40B are also arranged similar to the first drive track 36A, however the second drive tracks 40A, 40B include only two height segments and a single ramp. The second idler tracks 42A, 42B are arranged similar to the second drive tracks, but do not include an elevator block or attachment points for cables.

FIGS. 10-19 schematically illustrate example movements of the moonroof 14. In particular, these figures schematically illustrate the independent movement of the first and second panels 16, 18. In these figures, the first drive track 36A, first idler track 38A, second drive track 40A, and second idler track 42A are shown schematically. A first drive roller 56 is shown within the first drive track 36A, a first idler roller 82 is shown within the first idler track 38A, a second drive roller 84 is shown in the second drive track 40A, and a second idler roller 86 is shown in the second idler track 42A.

Figure 10:
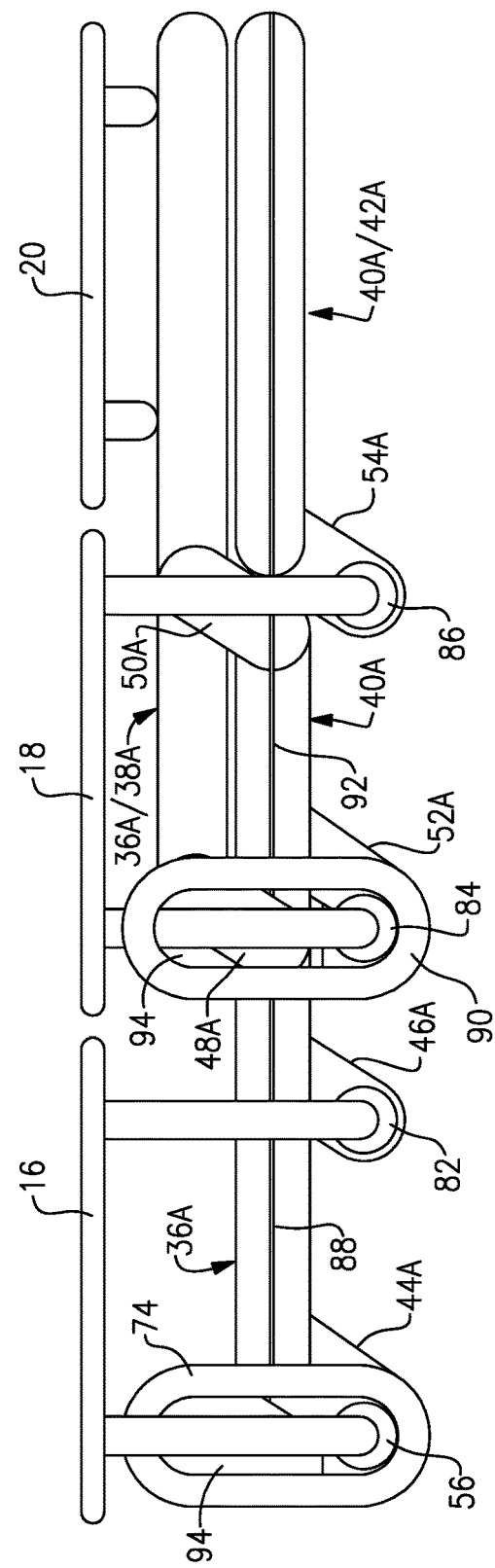
FIG. 10 schematically illustrates an example arrangement of the moonroof with the moonroof closed.

The first drive roller 56 is moveable by movement of the elevator block 74, which is coupled to a first cable 88. The first cable 88 is coupled to the first drive motor 64. Likewise, the second drive roller 84 is moveable by movement of another elevator block 90, which is coupled to the second drive motor 66 by a second cable 92. As shown in FIG. 10, the elevator blocks 74, 90 have an interior channel 94 with an increased dimension allowing the drive rollers 56, 84 to travel in the vertical direction.

In FIG. 10, the moonroof 14 is closed. In particular the drive rollers 56, 84 are in a forward-most position within their respective drive tracks 36A, 40A. The drive roller 56 is forward of the drive ramp 44A and the drive roller 84 is forward of the drive ramp 52A.

Figure 11:
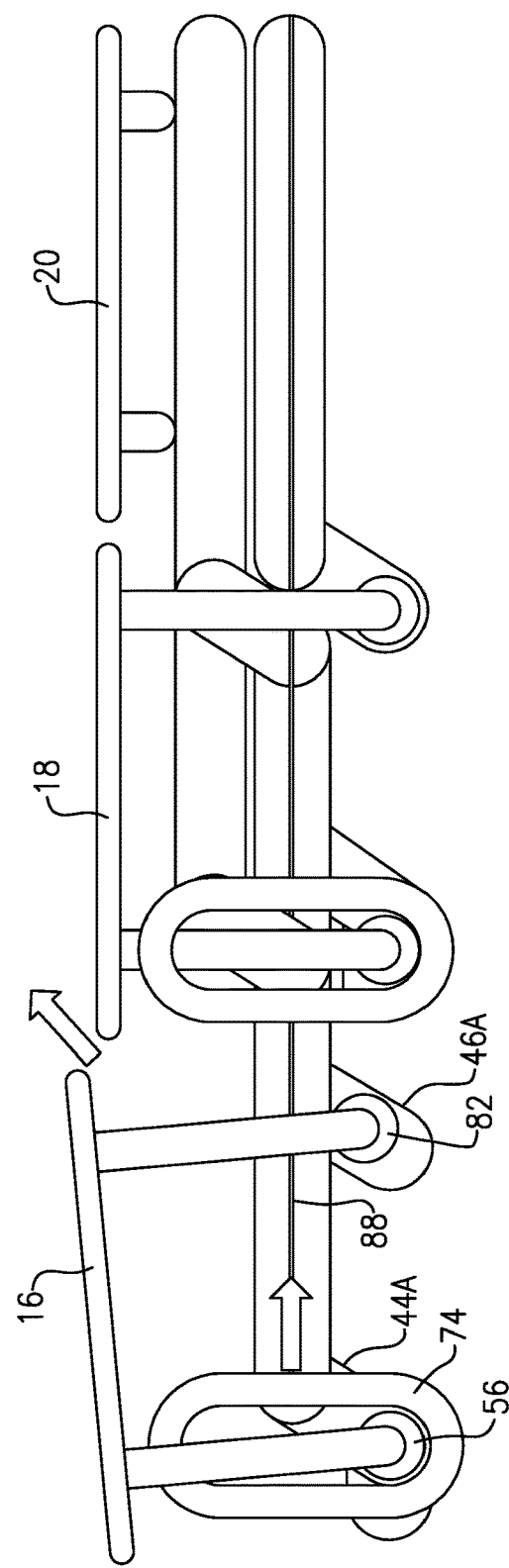
FIG. 11 schematically illustrates a first venting configuration of the moonroof.

In FIG. 11, the moonroof 14 is in a first venting configuration, in which the first panel 16 is inclined relative to the position of FIG. 10. To achieve this venting configuration, the first drive motor 64 drives the cable 88 in the rearward direction, which causes the rollers 56, 82 to engage respective ramps 44A, 46A. In FIG. 11, the rollers 56, 82 have not fully climbed the ramps 44A, 46A, causing the first panel 16 to tilt, which allows air to escape the vehicle cabin.

Figure 12:
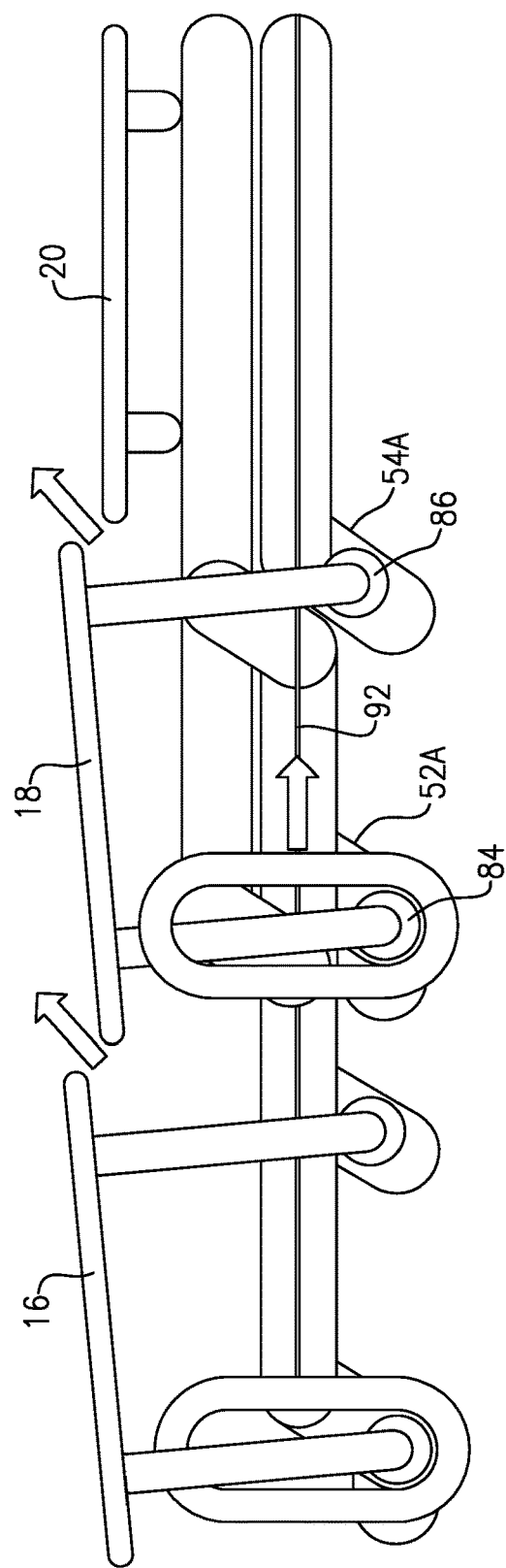
FIG. 12 schematically illustrates a second venting configuration of the moonroof.

FIG. 12 illustrates a second venting configured in which the first and second panels are inclined relative to their positions in FIG. 10. In FIG. 12, the first panel 16 is arranged substantially as shown in FIG. 11. The second panel 18 is also inclined, however. To incline the second panel 18, the second drive motor 66 drives the cable 92 in the rearward direction, which causes the rollers 84, 86 to engage respective ramps 52A, 54A. The rollers 84, 86 have only partially climbed the ramps 52A, 54A, which causes the second panel 18 to tilt. Air is allowed to escape the vehicle cabin between the first and second panels 16, 18, and also between the second and third panels 18, 20.

Figure 13:
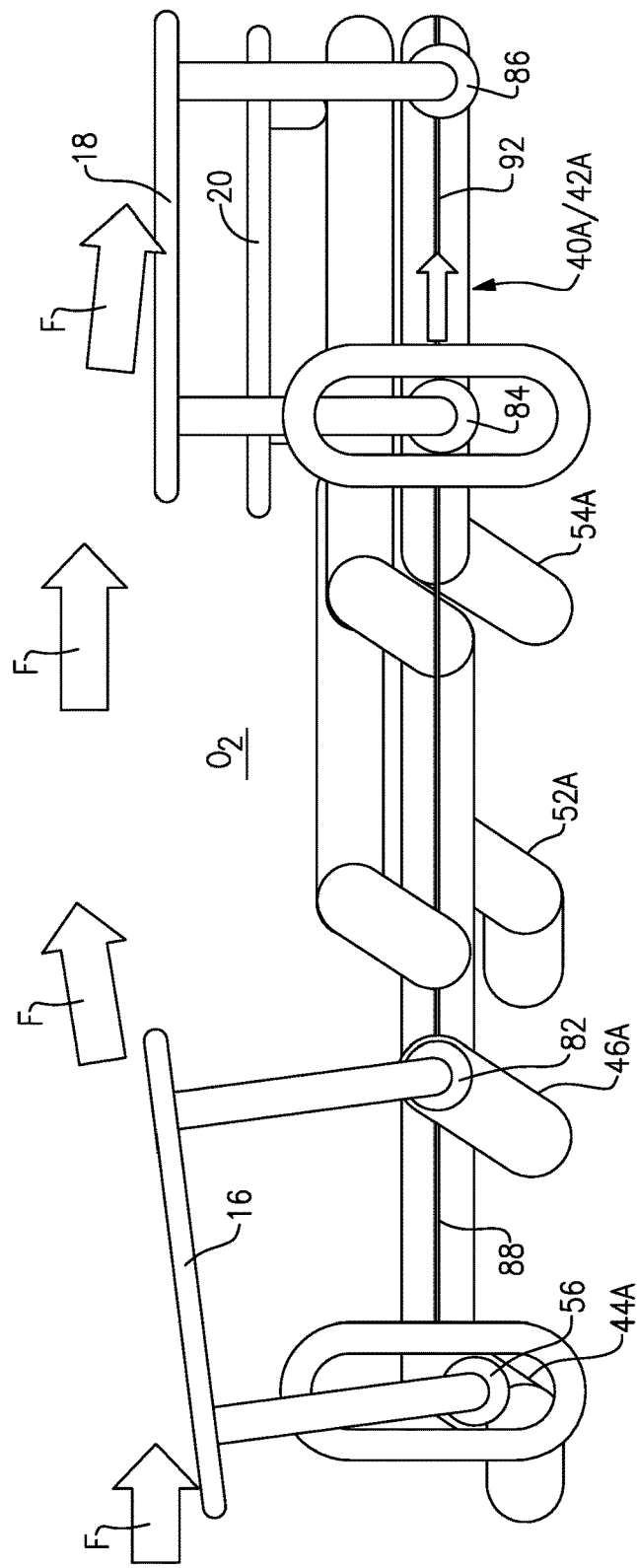
FIG. 13 schematically illustrates a third venting configuration of the moonroof.

FIG. 13 illustrates a third venting configuration of the moonroof 14. In FIG. 13, the first panel 16 is inclined as in FIGS. 11 and 12, and the second panel 18 is moved to a position over the third panel 20, exposing the opening $O_2$. To achieve the third venting configuration, the first drive motor 64 drives the cable 88 rearward to the position of FIGS. 11 and 12. Alternatively, the first panel 16 can be inclined at a different angle than the position of FIGS. 11 and 12. The second drive motor 66 drives the cable 92 rearward such that the drive roller 84 climbs the ramp 52A, the idler roller 86 climbs the ramp 54A, and each roller 84, 86 travels rearward along a respective track 40A, 42A until the second panel 18 is over the third panel 20 and the opening $O_2$ is exposed.

The configuration of the FIG. 13 substantially prevents air from entering the vehicle cabin via the second opening $O_2$, which reduces or eliminates the potential effects of "wind throb." Pressure build-up from having only one window open in a vehicle can cause a phenomenon sometimes referred to as "wind throb," which can cause passenger discomfort. With only one window open, air trying to enter through the open window generates a low frequency pressure pulsation, which is perceived as a "throbbing" sensation. Inclining the first panel 16 causes airflow F to be deflected vertically upward, substantially avoiding the opening $O_2$, which, again, reduces "wind throb."

FIGS. 14-19 schematically illustrate an example sequence of movements for opening the moonroof 14. In particular, FIGS. 14-19 schematically illustrate an example sequence of movements for moving the first and second panels 16, 18 above the third panel 20 to expose the opening $O_3$.

Figure 14:
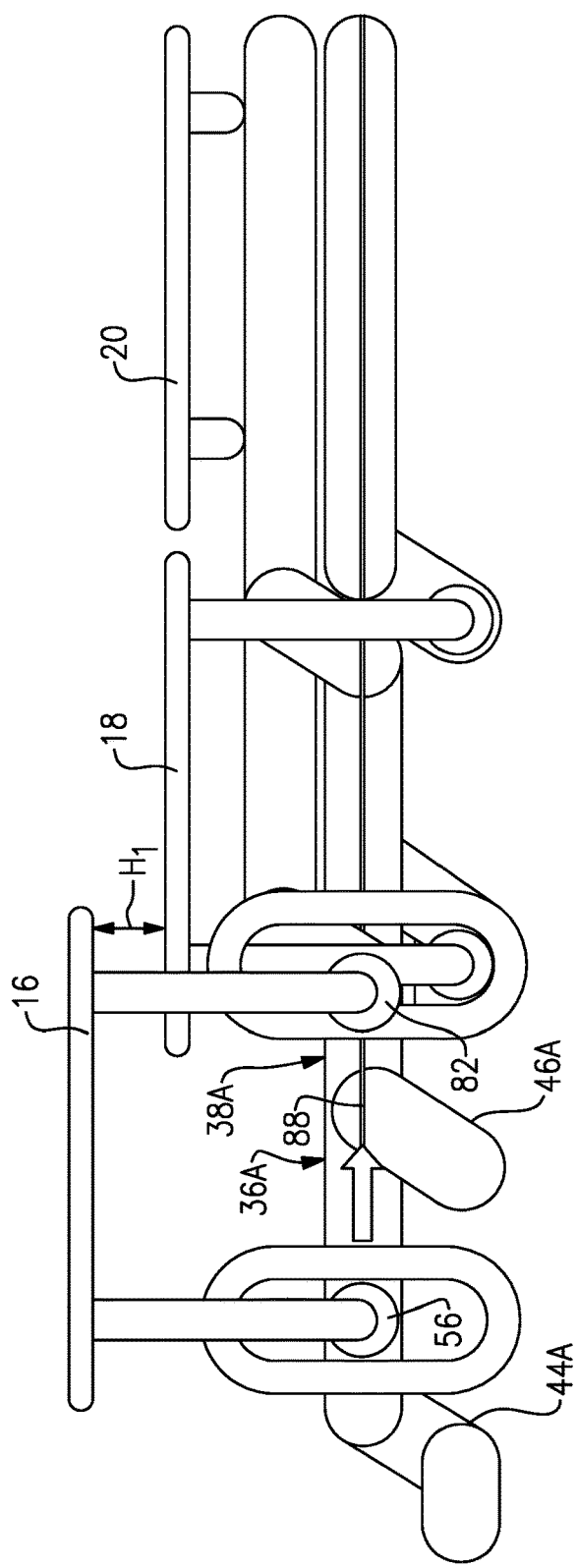
FIGS. 14-19 schematically illustrate a sequence of movements for opening the moonroof. In particular, FIG. 14 schematically illustrates the first panel moving rearward over the second panel.

In this example, the first panel 16 is moved rearward toward the third panel 20 first. It should be understood that the second panel 18 could be moved first, however. In FIG. 14, the first panel 16 has been moved rearward relative to the closed position by the first drive motor 64 pulling the cable 88. In FIG. 14, the rollers 56, 82 have climbed the ramps 44A, 46A and are traveling within respective tracks 36A, 38A at a first height $H_1$ above the second panel 18, which is closed. In this position, with reference to FIG. 9, the rollers 56A, 56B would be in the second segment 78.

Figure 15:
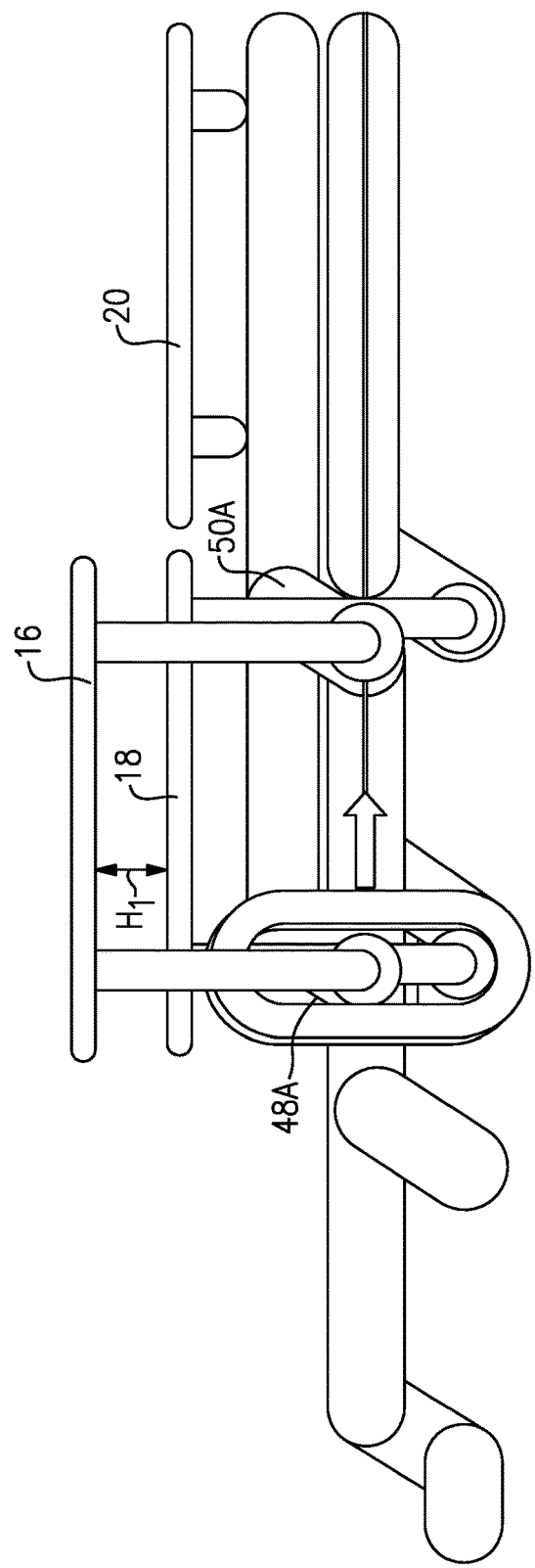
Figure 16:
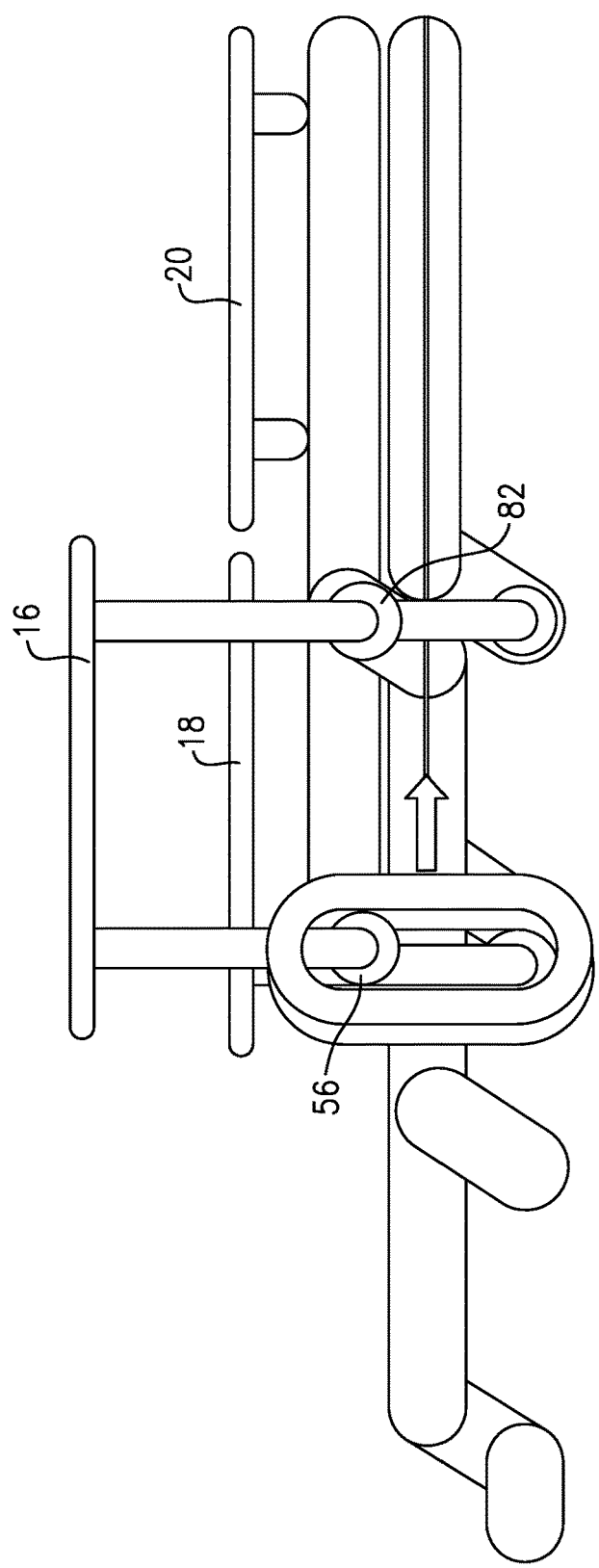
Figure 17:
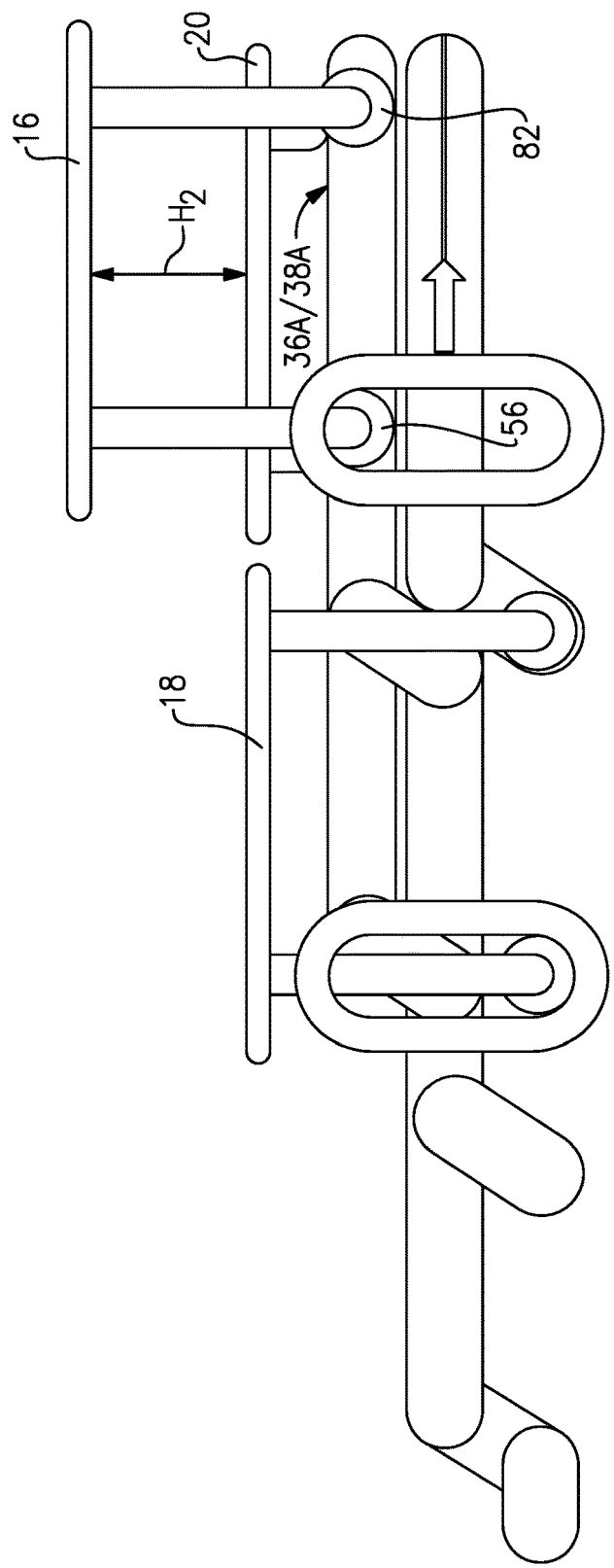

The rollers 56, 82 continue moving rearward until they engage the second ramps 48A, 50A, as shown in FIG. 15. Continued rearward movement causes the rollers 56, 82 to climb the second ramps 48A, 50A, as shown in FIG. 16, which raises the height of the first panel 16 again. The first panel 16 then travels along the respective tracks 36A, 36B at a second height $H_2$ greater than the first height $H_1$ as the first panel 16 moves over the third panel 20, as shown in FIG. 17. In this position, with reference to FIG. 9, the rollers 56A, 56B would be in the third segment 80.

Figure 18:
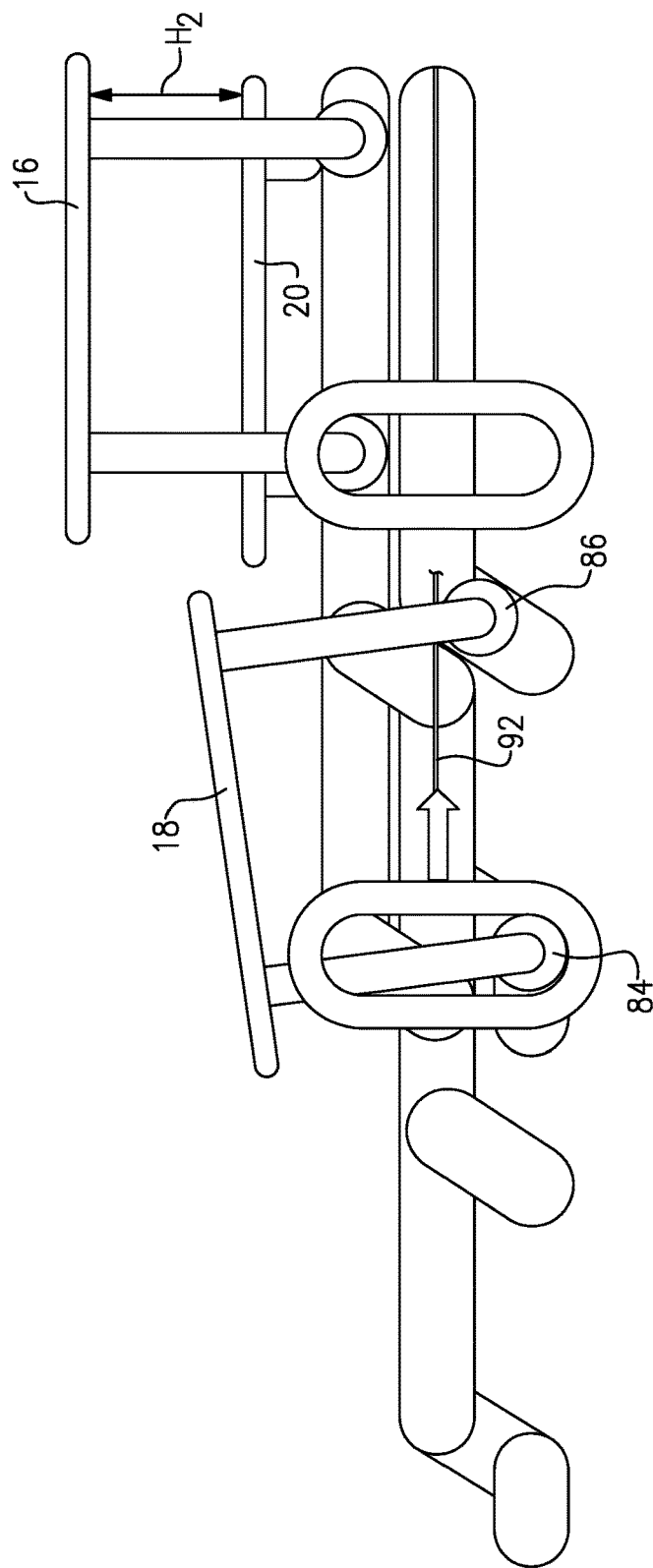
Figure 19:
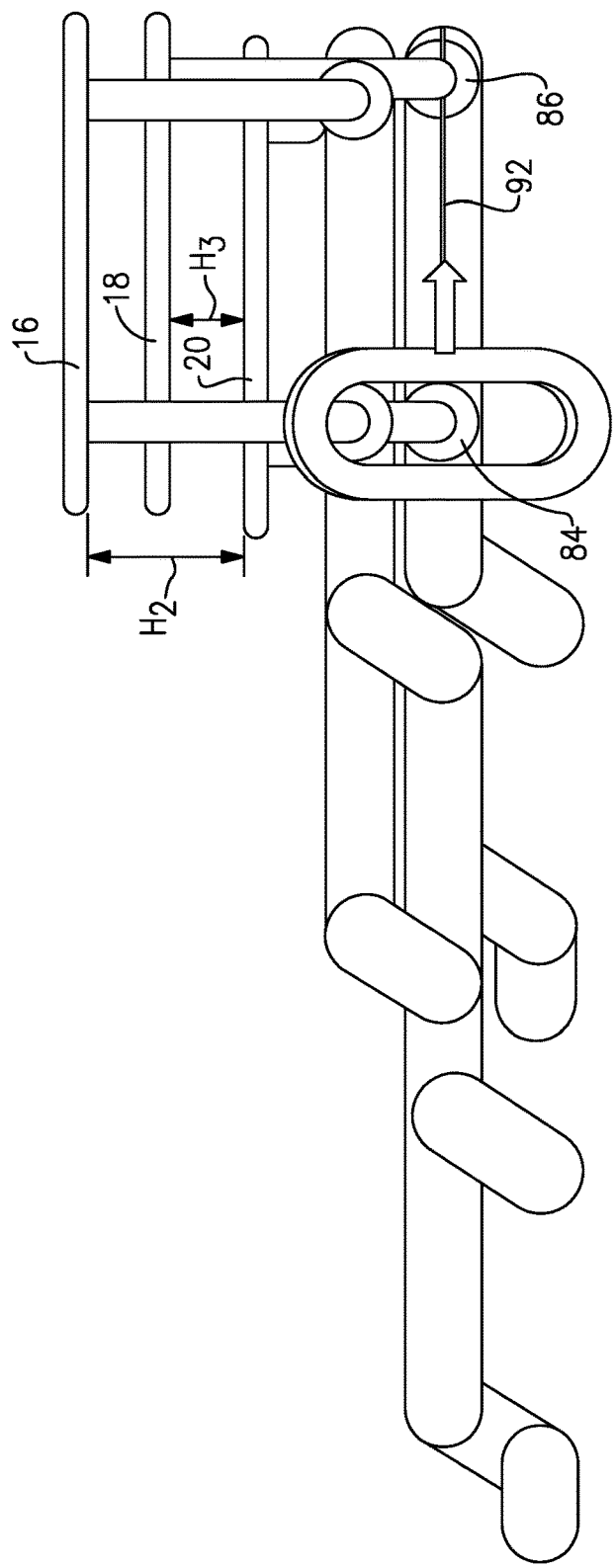

Raising the first panel 16 to the second height $H_2$ allows the second panel 18 to fit between the first and third panel 16, 20, as will now be shown. Referring to FIG. 18, the second panel 18 is moved rearward by the second drive motor 66, which drives the cable 92 rearward and causes the rollers 84, 86 to climb respective ramps 52A, 54A. When the rollers 84, 86 have climbed the ramps 52A, 54A, continued rearward movement of the cable 92 causes the rollers to travel over the third panel 20 at a third height $H_3$, which is less than the second height $H_2$. Thus, the second panel 18 fits between the first and third panels 16, 20 when over the third panel 20, as shown in FIG. 19. The arrangement of the tracks, including their relative orientations and variable height, prevents interference between the panels 16, 18, 20 and permits independent movement of the panels 16, 18, 20.

While example movements of the moonroof 14 have been shown schematically and described above, it should be understood that additional movements come within the scope of this disclosure. For example, the movements between FIGS. 14-19 could essentially be reversed to return the moonroof 14 to the closed position of FIG. 10. Further, while only certain components are illustrated in FIGS. 14-19 (e.g., these figures only show the tracks, rollers, and ramps on one side of the vehicle 10), it should be understood that corresponding components would be arranged similarly. For example, while FIGS. 14-19 show the drive track 36A but not the drive track 36B, the drive track 36B is arranged similarly to the drive track 36A.

Another aspect of this disclosure relates to a roller blind, which can be selectively deployed to limit sun exposure when the moonroof 14 is open or closed. With reference back to FIG. 8, a roller blind 96 is shown in a retracted position. The roller blind 96 is configured to be selectively deployed by a third drive motor 98. The third drive motor 98 is mounted adjacent the first and second drive motors 64, 66, and is also responsive to instructions from the controller 68. The third drive motor 98 is mounted to the body section 22, as is the roller blind 96. Accordingly, when retracted, the roller blind 96 and the third drive motor 98 can be removed from the vehicle 10 together with the body section 22.

Figure 20:
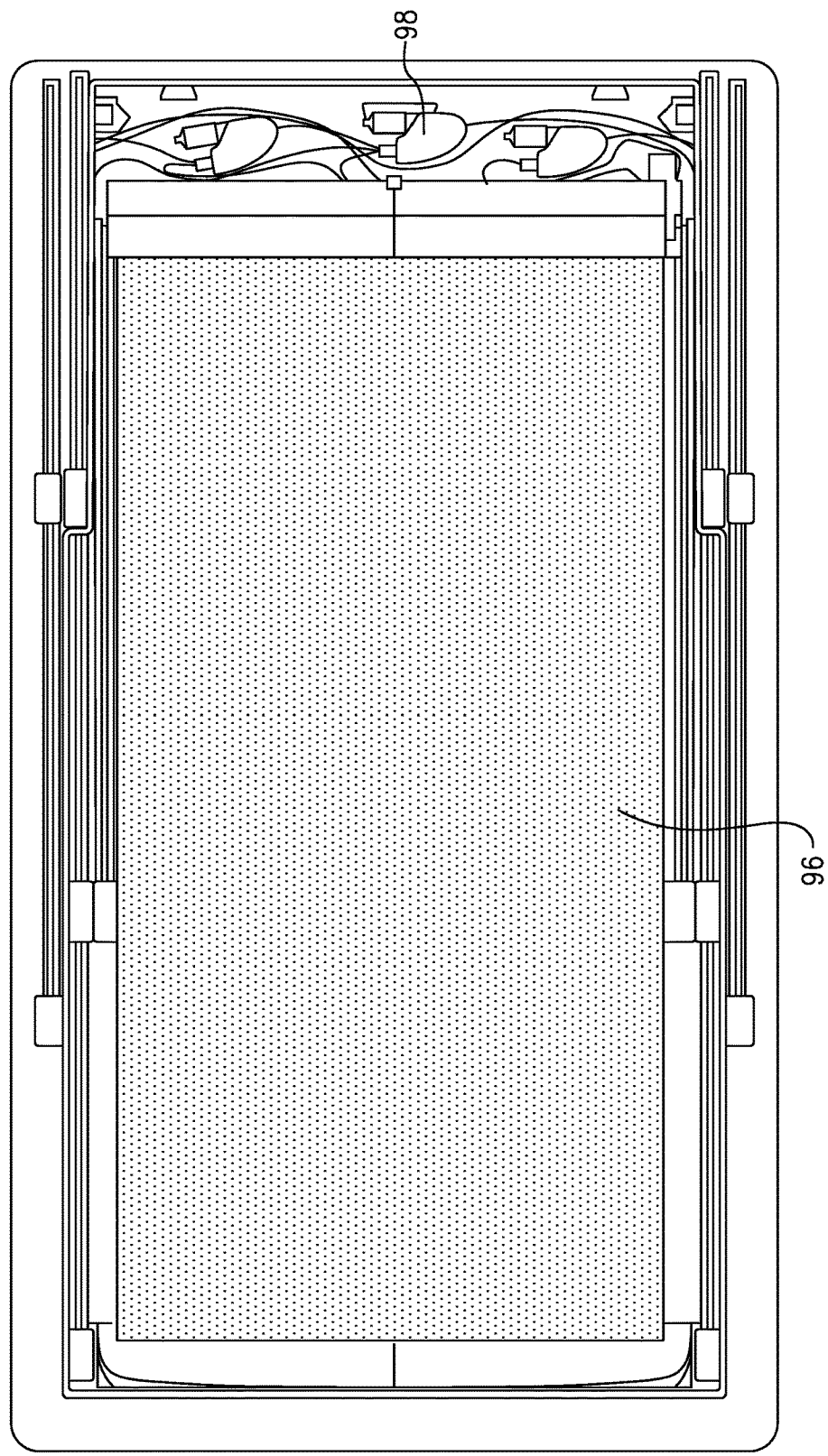
FIG. 20 is a top view of the motor vehicle and illustrates a roller blind in a fully deployed position.

FIG. 20 illustrates the roller blind 96 in a fully deployed position. The roller blind 96 is movable between the retracted position (FIG. 8) and the fully deployed position, and any number of incremental positions in between, to provide a desired level of sun protection for the occupants of the vehicle. The roller blind 96 may be made of a material resistant to ultraviolet (UV) light, and may be made of a mesh material.

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component or arrangement.

It should be understood that terms such as "about," "substantially," and "generally" are not intended to be boundaryless terms, and should be interpreted consistent with the way one skilled in the art would interpret those terms. Further, directional terms such as "above," "below," "forward," "rearward," "inside," "outside," "vertical," "top," and "bottom" are used with reference to an normal operational attitude of a motor vehicle, and are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a moonroof including a first panel, a second panel, and a third panel, wherein the second panel is forward of the third panel and rearward of the first panel when the moonroof is closed, wherein the first and second panels are independently moveable relative to the third panel, wherein the first and second panels are configured to move by traveling above a roof of the motor vehicle, wherein movement of the first panel is guided by a first set of drive tracks, movement of the second panel is guided by a second set of guide tracks, and the first and second sets of guide tracks each has a variable height along their length.

2. A motor vehicle, comprising:
a moonroof including a first panel, a second panel, and a third panel, wherein the second panel is forward of the third panel and rearward of the first panel when the moonroof is closed, wherein the first and second panels are independently moveable relative to the third panel, and wherein the first and second panels are independently moveable to a fully open position substantially above the third panel.

3. The motor vehicle as recited in claim 1, wherein:
the first set of tracks are arranged such that the first panel travels at a first height when over the second panel and a second height greater than the first height when over the third panel, and
the second set of tracks are arranged such that the second panel travels at a third height when over the third panel, the third height less than the second height.

4. The motor vehicle as recited in claim 1, wherein each of the first and second sets of tracks includes a set of drive tracks and a set of idler tracks.

5. The motor vehicle as recited in claim 4, further comprising a seal creating a seal path surrounding each of the sets of drive tracks.

6. The motor vehicle as recited in claim 1, further comprising a first drive motor configured to drive first panel and a second drive motor configured to drive the second panel.

7. The motor vehicle as recited in claim 6, further comprising a controller configured to command movement of the first and second drive motors.

8. The motor vehicle as recited in claim 6, wherein the first and second drive motors are mounted to a body section of the motor vehicle supporting the third panel, the body section removable from the remainder of the motor vehicle together with the first, second, and third panels and the first and second drive motors.

9. The motor vehicle as recited in claim 1, further comprising a roller blind configured to be deployed and retracted.

10. The motor vehicle as recited in claim 1, wherein the first and second panels are independently tiltable relative to a roof of the motor vehicle.

11. The motor vehicle as recited in claim 1, wherein the first, second, and third panels are glass panels.

12. A method, comprising:
independently moving a second panel of a moonroof relative to a first panel of the moonroof and a third panel of the moonroof, wherein the second panel is forward of the third panel and rearward of the first panel when the moonroof is closed; and
moving the first and second panels in a rearward direction to a fully open position above the third panel.

13. The method as recited in claim 12, further comprising independently tilting the first and second panels relative to a roof.

14. The method as recited in claim 12, further comprising varying a height of the first and second panels as the first and second panels move in the rearward direction.

15. The method as recited in claim 14, wherein the first panel travels over the second panel at a first height and travels over the third panel at a second height greater than the first height, and wherein the second panel travels over the third panel at a third height less than the second height.

16. The method as recited in claim 12, further comprising removing a section of a body of a vehicle containing the first, second, and third panels when the first and second panels are in the fully open position.

* * * * *

UNITED STATES PATENT AND TRADEMARK OFFICE
CERTIFICATE OF CORRECTION

| | |
|---|---|
| PATENT NO. | : 10,202,026 B1 |
| APPLICATION NO. | : 15/673725 |
| DATED | : February 12, 2019 |
| INVENTOR(S) | : Adrian Nania |

It is certified that error appears in the above-identified patent and that said Letters Patent is hereby corrected as shown below:

In the Claims

In Claim 6, Column 11, Line 18; replace "to drive first panel" with --to drive the first panel--

In Claim 10, Column 12, Line 3; replace "a roof of the motor vehicle." with --the roof of the motor vehicle.--

Signed and Sealed this
Eighteenth Day of June, 2019

Andrei Iancu
*Director of the United States Patent and Trademark Office*